Feb. 12, 1963
R. F. PLUMB
3,077,266
SPLIT DECK VIBRATING SCREEN
Filed March 10, 1961
3 Sheets-Sheet 1
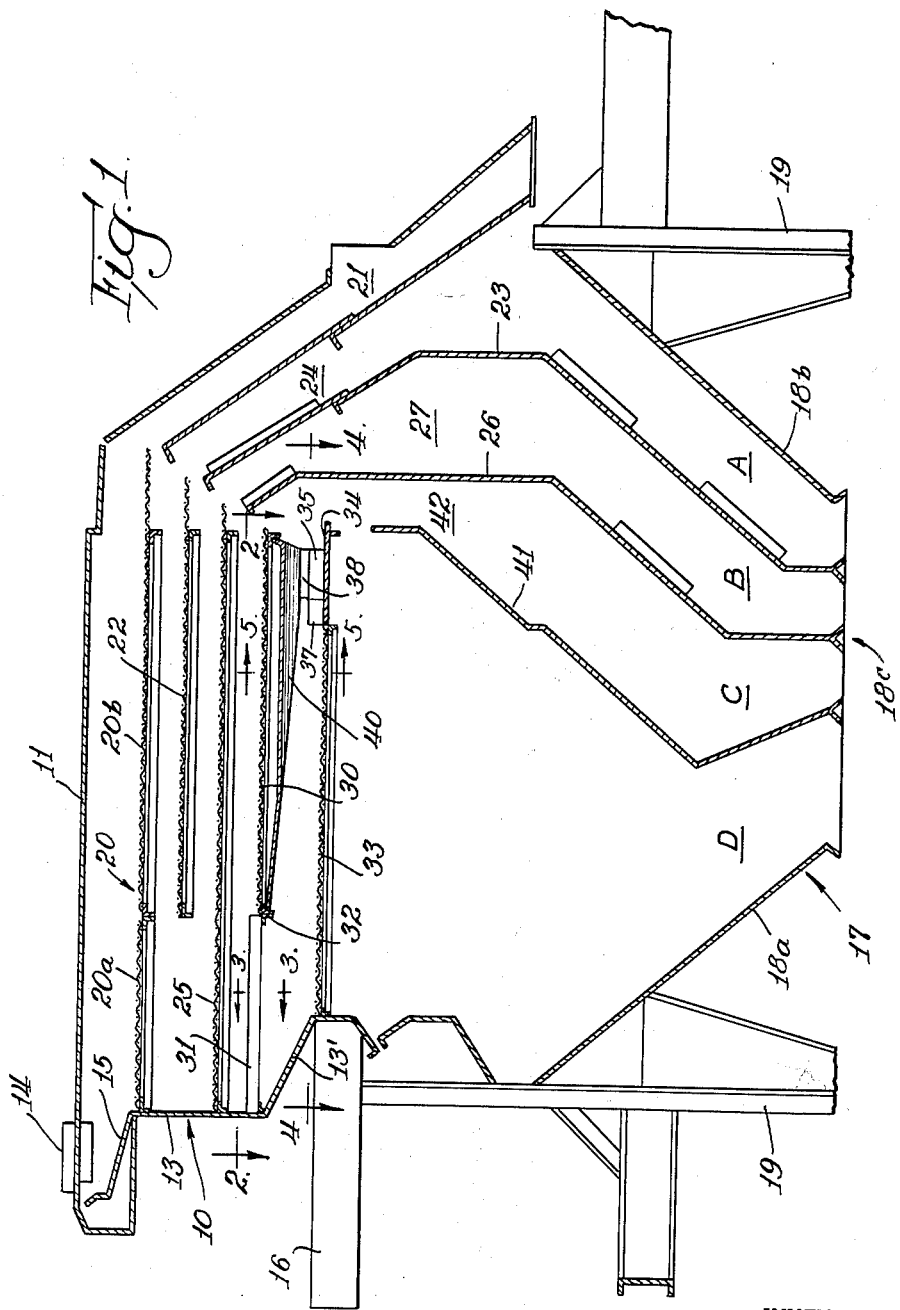
INVENTOR.
Robert F. Plumb
BY
Haven E. Simmons
Att'y.

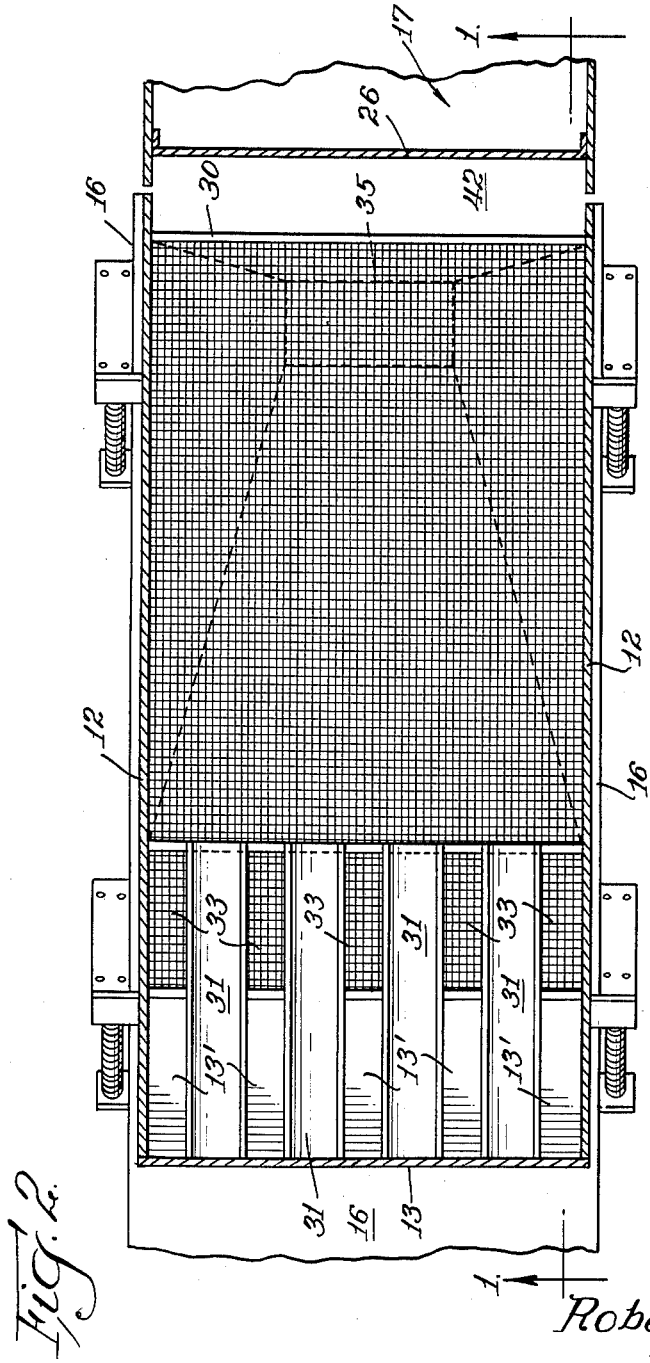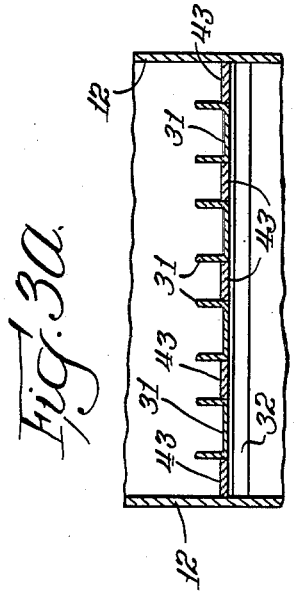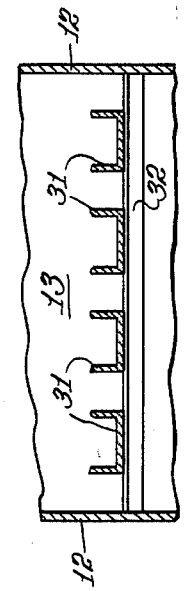

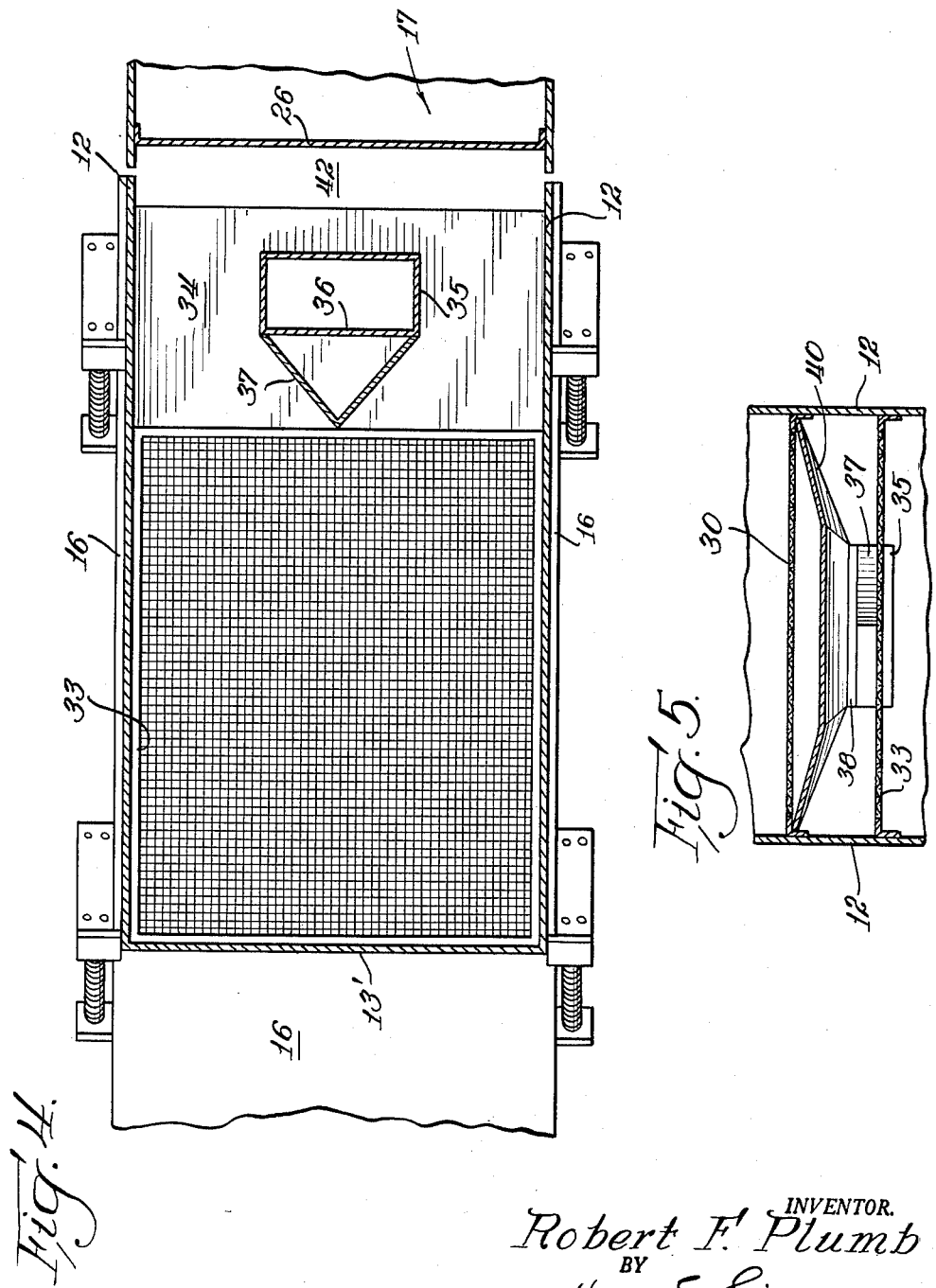

United States Patent Office 3,077,266
Patented Feb. 12, 1963

3,077,266
SPLIT DECK VIBRATING SCREEN
Robert F. Plumb, Cedar Rapids, Iowa, assignor to Iowa
Manufacturing Company, Cedar Rapids, Iowa
Filed Mar. 10, 1961, Ser. No. 94,898
2 Claims. (Cl. 209—317)

The present invention pertains to a vibrating screen of the type used, for instance, for grading granular material for a bituminous mixing plant, and more particularly to increasing the capacity of such screens in order to screen the fine fractions of such material without increasing the over-all dimensions of any of the screen decks in the screen.

It is well known in the screening art that the final screening of the fine fractions in which relatively fine mesh screens are employed requires much greater screen area than does the initial screening of the coarser fractions from the fine in which relatively large mesh screens are employed. In the screens of the prior art, for instance those shown in U.S. Patents No. 2,008,648 to Symons and No. 2,312,477 to Pollitz, the area which can be devoted to screening the fine fractions is normally limited to the area of the largest screen deck which can be accommodated within the screen. Accordingly, in the past in order to increase the screen area available for the fine fractions it was necessary to increase the dimensions or area of the fine screen deck. This solution has several serious drawbacks. In the first place, the size of the screen itself must be increased which may well present serious space problems when the screen is used as a part of an integrated bituminous mixing plant. In the second place, increasing the size of the fine screen deck requires a similar increase in the dimensions or area of the upper, coarser screen decks and the consequent increased investment in and maintenance of unnecessarily large areas of screen for the coarser fractions.

The present invention greatly increases the screen area for the fine fractions without, however, the disadvantages enumerated above by providing two or more fine screen decks of normal area and splitting the material passing the preceding coarser decks between and feeding it onto each of the multiple fine decks. The splitting of the feed is achieved by laterally spaced channels which carry part of the feed on to the uppermost fine screen deck, the spaces therebetween permitting the remainder of the material to fall therethrough directly from the coarser deck to the lower fine screen deck or decks. In addition, the spaces between the channels are made adjustable by removable inserts so that the quantity of material reaching each fine screen deck can be varied, thus permitting the most suitable balancing of loads between the fine decks. A collector pan is located beneath each upper fine screen deck so that the material screened by each of the latter is carried off and segregated from the next lower deck. Additionally, a more uniform consistency of the screened fine fractions throughout the collector bin or bins is achieved in a manner more fully described hereafter. As a result the fine screen area of a screen is increased 75% or more, depending upon the number of additional fine screen decks used, without increasing the size of any single screen deck or the dimensions of the screen itself, except perhaps the depth of the latter, depending upon how many additional fine decks are stacked therein.

Accordingly, the primary object of the present invention is the provision of a vibrating screen of the kind described affording greater increased screening capacity for the fine fractions of granular material without at the same time increasing the area of any one of the other screen decks.

Another object of the present invention is to provide a screen of the type described with a plurality of stacked fine screen decks and means to divide the feed thereto from the coarser decks between and onto the fine decks.

A further object of the present invention is a screen of the kind described employing a pair of fine screen decks in stacked relation and a number of laterally spaced feed channels leading on to the upstream end of the upper fine deck in order to split the feed between each of the fine screen decks.

Another object of the present invention is the provision of a bin structure beneath the screen which, in conjunction with the splitting of the feed between two fine screen decks, permits a more uniform consistency of the screened fine fractions in the bin.

Other and further objects, features and advantages of the present invention will be apparent from the preferred form thereof, hereafter described, read in conjunction with the drawings, in which:

FIGURE 1 is a somewhat diagrammatical, side elevation, partly in section, along the line 1—1 of FIGURE 2, representing the upper portion of a typical bituminous mixing plant showing a screen incorporating the present invention with a bin assembly mounted therebelow;

FIGURE 2 is a horizontal section along line 2—2 of FIGURE 1;

FIGURE 3 is a vertical section along line 3—3 of FIGURE 1;

FIGURE 3A is a vertical section also along line 3—3 of FIGURE 1 showing the screen converted to operate in conventional fashion;

FIGURE 4 is a horizontal section along line 4—4 of FIGURE 1; and

FIGURE 5 is a vertical section along line 5—5 of FIGURE 1.

Inasmuch as both screens generally and their combination with other apparatus in a bituminous mixing plant are well known, it is not believed necessary to describe either other than in general fashion, the present invention having to do wholly with the interior construction and arrangement of the screen itself.

Overall Assembly

Turning first, therefore, to a general description of the screen and some of the equipment associated therewith in a typical bituminous mixing plant, reference numeral 10 designates a generally rectangular screen of well-known variety having a top closure 11, side walls 12 and end wall 13, the bottom and the remaining end of screen 10 being left open. Top closure 11 overhangs end wall 13 and is provided in its overhanging portion with a material entrance or ingress 14 directly below which is a feed plate 15 extending between side walls 12 and inclining downwardly and over the upper edge of end wall 13. A lower portion 13' of end wall 13 inclines inwardly and downwardly into a rectangular base 16 atop which screen 10 is mounted in a suitable manner, such as is shown in Patent 2,312,477 to Pollitz, so that it both opens downwardly therethrough and may vibrate in an appropriate manner relative thereto. The vibratory motion may be induced by any one of a number of well-known mechanisms therefor (not shown), one of which is also described in the aforesaid patent to Pollitz. The open end of screen 10 and the open underside of base 16 communicate in the manner hereinafter described with a bin assembly 17, having end walls 18a and 18b and an open bottom 18c, located beneath base 16 so that the latter opens therein and extending beyond and beneath the open end of screen 10. Screen 10, base 16 and bin assembly 17 are typically mounted on a substructure 19, straddling bin assembly 17, to form, as in the present embodiment, the upper portion of a bituminous mixing plant.

Screen and Bin Assembly

Turning now to a more detailed description of the assemblies within screen 10, the latter is provided just below the upper edge of end wall 13 with a horizontally mounted, composite top screen deck 20 extending between side walls 12 and from end wall 13 to beyond the open end of screen 10. Hereafter the end of screen 10 adjacent end wall 13 will be referred to as the "feed" or "upstream" end and the open end of screen 10 as the "discharge" or "downstream" end. It will be therefore understood that terms such as "downstream of" or "upstream of" refer to the "right of" or to the "left of" relative to FIGURE 1. Top deck 20, in turn, is composed of an upstream, relatively short, intake deck 20a adjacent end wall 13 and a downstream, relatively longer, discharge deck 20b of larger or coarser mesh than that of deck 20a. Cooperating with the discharge end of deck 20 is an oversize chute 21 leading downwardly therefrom past the open end of screen 10 to beyond bin assembly 17. Stacked below upper deck 20 is an intermediate screen deck 22 whose mesh is equal to that of intake deck 20a. Deck 22 extends between side walls 12, its feed end located directly below the upstream end of discharge deck 20b and its discharge end beyond the open end of screen 10 and spaced from the adjacent, descending wall of oversize chute 21. Below the discharge end of deck 22 and leading therefrom a partition 23 forms with the side walls of bin assembly 17 and the underwall of chute 21 an additional chute 24, and angles on downwardly past the open end of screen 10 to bottom 18c of bin assembly 17 in order to form with end wall 18b and a portion of bottom 18c adjacent thereto a compartment A therein. Stacked below deck 22 between side walls 12 is a center screen deck 25 of finer mesh than intermediate deck 22, its feed end positioned against end wall 13 and its discharge end beyond the open end of screen 10 and spaced from the adjacent portion of partition 23. Leading downwardly from the discharge end of deck 25 a further partition 26 forms with partition 23 and the side walls of bin assembly 17 a chute 27 leading into a compartment B formed by a portion of bottom 18c of bin assembly 17 and the lower portions of partitions 23 and 26.

A bottom screen deck 30, level with the lower edge of end wall 13 and of a mesh finer than that of center deck 25, extends between side walls 12, its feed end located directly below the feed end of intermediate deck 22 and its discharge end spaced from the adjacent portion of partition 26. Between the feed end of deck 30 and the lower edge of end wall 13 a series of feed splitters 31 are mounted laterally spaced between side walls 12 so that they lead on to the feed end of deck 30. In the embodiment illustrated in the drawings, feed splitters 31 are formed simply from ordinary lengths of channel positioned so that they open upwardly under center deck 25, but of course any other suitable structure can be employed. Preferably, feed splitters 31 are mounted so that they are easily removable and also so that each is laterally movable relative to the others between side walls 12. This may be accomplished in a number of ways, that shown in the drawings being merely a pair of angle irons 32, one secured to end wall 13 and the other to the lower edge of the feed end of deck 30, upon which the respective ends of splitters 31 sit. Finally, a second bottom screen deck 33 of a mesh size equal to that of bottom deck 30 is stacked below the latter, immediately above base 16, with its feed end at the lower edge of wall 13' and its discharge end leading on to a floor 34 which in turn terminates directly below the discharge end of deck 30. The length of floor 34 need be only sufficient to permit the insertion at the central portion thereof of chute 35 opening down therethrough. The latter is substantially narrower than screen 10 and rises above floor 34 to a point below the underside of deck 30. The upstream wall 36 of chute 35 is provided with a prow-like deflector 37 pointing upstream and the upper mouth of chute 35 receives the spout 38 of a four-sided pan 40 emptying therein. The spacing between screen decks 30 and 33 and the height of chute 35 above floor 34 are arranged so that the four sides of pan 40 can slope upwardly from spout 38 to underlie all of screen deck 30, whereby all material passing therethrough is collected and directed into chute 35. Spaced just below the discharge end of floor 34 and from partition 26, a partition 41 extends first downwardly and then angles sharply inwardly under deck 33 to form with partition 26 and the side walls of bin assembly 17 a descending chute 42. Partition 41 continues downwardly to bottom 18c of bin assembly 17 where the lower portion thereof and of partition 26, together with a portion of bottom 18c adjacent the latter, form a compartment C. Partition 41, end wall 18a and the remainder of bottom 18c of bin assembly 17 form a fourth compartment D directly below deck 33. The bottom of each compartment A, B, C and D is closed by a suitable bin gate (not shown) so that material may be withdrawn therefrom.

Operation

When screen 10 is caused to vibrate in appropriate manner and material is induced through ingress 14, it spills first upon intake deck 20a. Since the finer fractions are screened more readily through the relatively coarse mesh of deck 20a than the larger fractions, the bulk of the former pass directly through deck 20a to the feed end of center deck 25. The coarser fractions of the incoming material retained on deck 20a then pass downstream to discharge deck 20b which is coarser and of greater length than intake deck 20a. Here the coarsest acceptable fractions are screened, passing therethrough to intermediate deck 22, while the oversize pieces continue on downstream to oversize chute 21. Since intake deck 20a and intermediate deck 22 are of equal mesh size, the material passing through each and arriving upon center deck 25 is of the same composition, sizewise. The material which was retained on intake deck 20a but later passed through discharge deck 20b is therefore retained on intermediate deck 22 and thence carried to chute 24 and collected in bin A. Likewise, the material retained on center deck 25 moves therealong to chute 27 and thence into bin B. The bulk of the finest fractions which passed almost immediately through intake deck 20a on to the feed end of center deck 25 will, for the same reason, also pass through adjacent the feed end of the latter, a portion of them being intercepted by feed splitters 31 and fed therefrom to bottom deck 30 while the remainder fall directly through to bottom deck 33. In other words, the task of screening the bulk of the finest fractions is split by virtue of feed splitters 31 between bottom deck 30 on the one hand and bottom deck 33 on the other hand. The material retained on deck 30 progresses therealong and spills into chute 42 and likewise the similar material retained on deck 33 progresses therealong, around deflector 37, over floor 34 and also spills into chute 42, whereby the material retained on both deck 30 and deck 33 is deposited in bin C. The finest fractions passing through decks 30 and 33 are each deposited in bin D, those from deck 30 having been collected by pan 40 from whence they are carried down chute 35 emptying into bin D, while those from deck 33 fall directly into bin D.

It is worthwhile pointing out that the foregoing arrangement assures an unusually even distribution of the fine fractions in bin D inasmuch as the finest of the fine fractions which pass through the upstream portion of deck 30 are thoroughly mixed with the somewhat larger fractions passing through the more downstream portion of deck 30 before both are dumped down chute 35 into bin D, whereupon partition 41 angling back under deck 30 deposits the mixture evenly in the lower portion of bin D. Likewise, the larger of the fine fractions passing through the downstream portion of deck 33 are deflected by partition 41 to meet and intermix with the finest fractions passing through the upstream portion of deck 33. In this manner, therefore, the material deposited in bin D is of unusually uniform consistency.

The splitting of the feed between decks 30 and 33 can be adjusted by varying the number of feed splitters 31 so that more or less material falls through to deck 33. If it is desired to operate screen 10 in a conventional manner, that is, with only one bottom or fine deck operating, this can be accomplished by inserting blanking plates 43, or similar means, between splitters 31, as is shown in FIGURE 3A, whereupon all the material passing center deck 25 will be directed on to deck 30 and deck 33 will be inoperative.

While the present invention has been described in terms of a particular embodiment and application and detailed language has been used, it will be understood that it is not so limited and that, in particular, the method incorporated therein may be carried out by other forms of apparatus and in other applications.

I claim:

1. A vibrating screen and bin combination comprising an enclosure having top, side and end walls and an open bottom; an upper material ingress to said enclosure; at least one coarse screen deck operatively stacked in said enclosure below said ingress and a pair of operatively stacked fine mesh screen decks in said enclosure below said coarse deck; said enclosure being arranged to vibrate in a manner sufficient to impart progressive movement of material to be graded across and through said screen decks; said coarse deck being positioned to receive adjacent its upstream end material to be graded passed into said enclosure through said ingress and the upper of said fine decks being positioned to receive material passed through said coarse deck; means including feed splitting means adjacent the upstream end of the upper fine deck to receive material to be graded from the upstream portion of said coarse deck and to split said material between and carry it on to each of said fine decks at their upstream ends; a collector pan located between said fine decks and vibrating therewith to receive and carry off material passed through said upper fine deck, said pan at its downstream end discharging into a vertically inclined chute, said pan end and chute being located immediately beneath the portion of said upper fine deck just upstream of its downstream end and said chute extending down past the lower fine deck adjacent the downstream end thereof; and a compartmented bin assembly beneath said enclosure, one of said compartments being disposed in material collecting position beneath said chute and said lower fine screen deck, said assembly having a partition wall forming said compartment positioned to intercept the material passed through both the downstream portion of said lower fine deck and that discharged from said chute and to direct it to intercept and mix with the material passed through the upstream portion of said lower fine deck.

2. A vibrating screen and bin combination comprising an enclosure having top, side and end walls and an open bottom; an upper material ingress to said enclosure; at least one coarse screen deck operatively stacked in said enclosure below said ingress and a pair of operatively stacked fine mesh screen decks in said enclosure below said coarse deck; said enclosure being arranged to vibrate in a manner sufficient to impart progressive movement of material to be graded across and through said screen decks; said coarse deck being positioned to receive adjacent its upstream end material to be graded passed into said enclosure through said ingress and the upper of said fine decks being positioned to receive material passed through said coarse deck; means including feed splitting means adjacent the upstream end of the upper fine deck to receive material to be graded from the upstream portion of said coarse deck and to split said material between and carry it on to each of said fine decks at their upstream ends; means located between said fine decks to receive and carry off material passed through said upper fine deck and to discharge it downwards past the downstream end of the lower fine deck; and a collector bin disposed in material collecting position beneath said means and said lower fine screen deck, said bin having a wall sloping back under both the downstream portion of said lower fine deck and said means in order to mix the material passing therethrough with the material passed through the upstream portion of said lower fine deck.

References Cited in the file of this patent

UNITED STATES PATENTS

| | | |
|---|---|---|
| 733,732 | Muller | July 14, 1903 |
| 852,050 | Barbeau | Apr. 30, 1907 |
| 989,686 | Adelsperger | Apr. 18, 1911 |
| 2,683,533 | Paul | July 13, 1954 |
| 2,908,391 | Frevert | Oct. 13, 1959 |

FOREIGN PATENTS

| | | |
|---|---|---|
| 737,377 | Germany | July 12, 1907 |